(12) United States Patent
Germain et al.

(10) Patent No.: US 7,771,502 B2
(45) Date of Patent: Aug. 10, 2010

(54) DRAWER AIR-FILTER DEVICE AND INLET ASSEMBLY HAVING SUCH A DEVICE

(75) Inventors: Laurent Germain, Jeuxey (FR); François Cottet, Freland (FR); Hugues Winkelmuller, Colmar (FR)

(73) Assignee: Mark IV Systemes Moteurs (SAS), Courbevoie (FR)

(*) Notice: Subject to any disclaimer, the term of this patent is extended or adjusted under 35 U.S.C. 154(b) by 341 days.

(21) Appl. No.: 11/936,466

(22) Filed: Nov. 7, 2007

(65) Prior Publication Data

US 2008/0110146 A1  May 15, 2008

(30) Foreign Application Priority Data

Nov. 7, 2006 (FR) .................................. 06 54761

(51) Int. Cl.
*B01D 46/10* (2006.01)
(52) U.S. Cl. .......................................... 55/481; 55/506
(58) Field of Classification Search ................ 55/385.3, 55/492, 493, 502, 503, 504, 497, 521, 478, 55/480, 481, 506; 123/198 E, 195 C, 184.57, 123/41.7, 41.31; 454/276, 271; 180/68.2, 180/68.3, 68.5
See application file for complete search history.

(56) References Cited

U.S. PATENT DOCUMENTS

| | | | |
|---|---|---|---|
| 5,740,774 A | | 4/1998 | Kennedy |
| 6,217,627 B1 * | | 4/2001 | Vyskocil et al. ............... 55/492 |
| 6,422,197 B1 * | | 7/2002 | Amann et al. ............ 123/198 E |
| 6,440,189 B1 * | | 8/2002 | Sugano et al. ............. 55/385.3 |
| 6,623,350 B2 * | | 9/2003 | Goupil et al. ................ 454/158 |
| 6,808,547 B2 * | | 10/2004 | Ota et al. ....................... 55/478 |
| 6,878,176 B2 * | | 4/2005 | Roudet et al. ................. 55/357 |

(Continued)

FOREIGN PATENT DOCUMENTS

EP 0391019 A1 10/1990

(Continued)

OTHER PUBLICATIONS

European Search Report for European Patent Application No. EP07120798.1, Mailed Feb. 20, 2008, pp. 6 (lists same references as French Search Report).

(Continued)

*Primary Examiner*—Duane Smith
*Assistant Examiner*—Minh-Chau T Pham
(74) *Attorney, Agent, or Firm*—Sheridan Ross PC

(57) ABSTRACT

An air-filter device for a motor vehicle, having a casing and a filtering body separating the clean and dirty compartment, and also having a supporting body for the filtering body and a compression body designed to co-operate mechanically with the supporting body, these bodies being mounted in the manner of sliding drawers in an intermediate mounting compartment; the contact surfaces in mutual sliding bearing of the support and compression bodies are inclined in such a way that the forced stress position leading to a compression of the seal of the filtering body is achieved by displacement of the compression body in the direction of extraction and in that the control device, bringing about this displacement, stresses the supporting body and/or the casing in order to achieve the displacement of the compression body in a forced stress position, at least at the end of displacement.

12 Claims, 10 Drawing Sheets

U.S. PATENT DOCUMENTS 7,128,643 B2 * 10/2006 Beliveau et al. ............. 454/276
7,323,029 B2 * 1/2008 Engelland et al. ............. 55/502
2004/0020177 A1 2/2004 Ota et al.

FOREIGN PATENT DOCUMENTS

WO  WO 2005/079954 A  9/2005
WO  WO 2006/009766 A  1/2006

OTHER PUBLICATIONS

Search Report prepared by Institut National De La Propriete Industrielle on Jun. 5, 2007, for French Patent Application No. FR0654761.

* cited by examiner

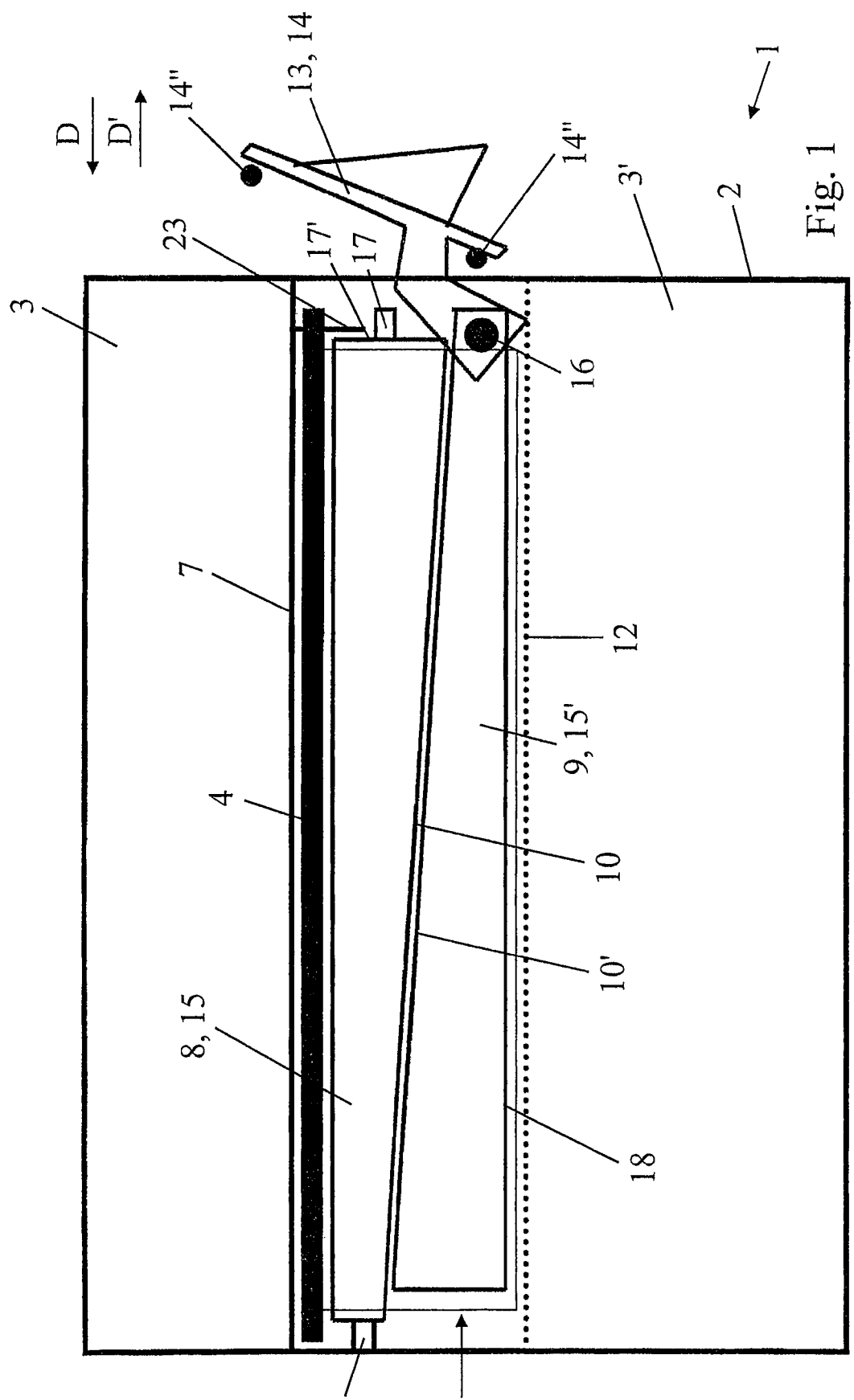

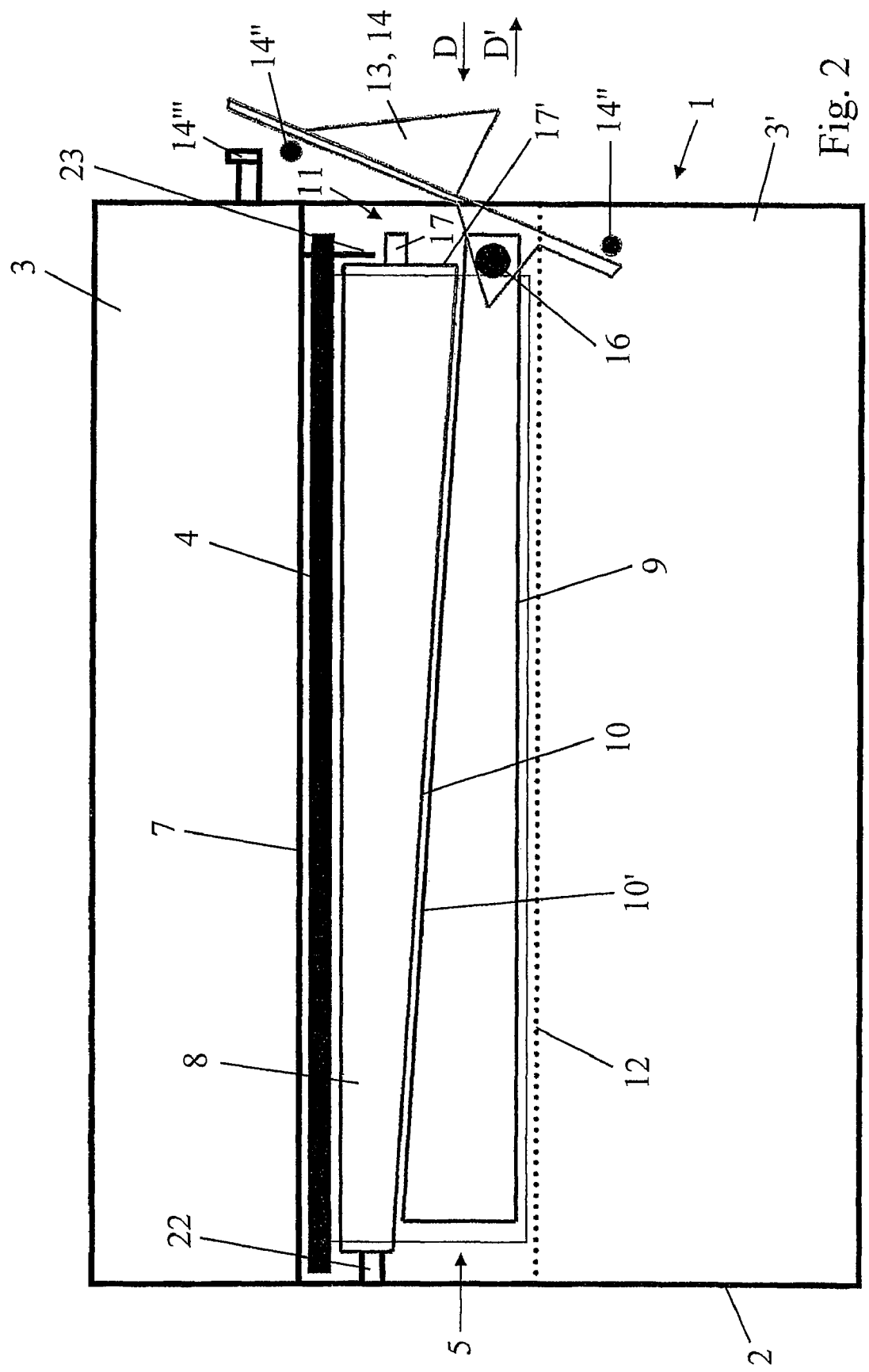

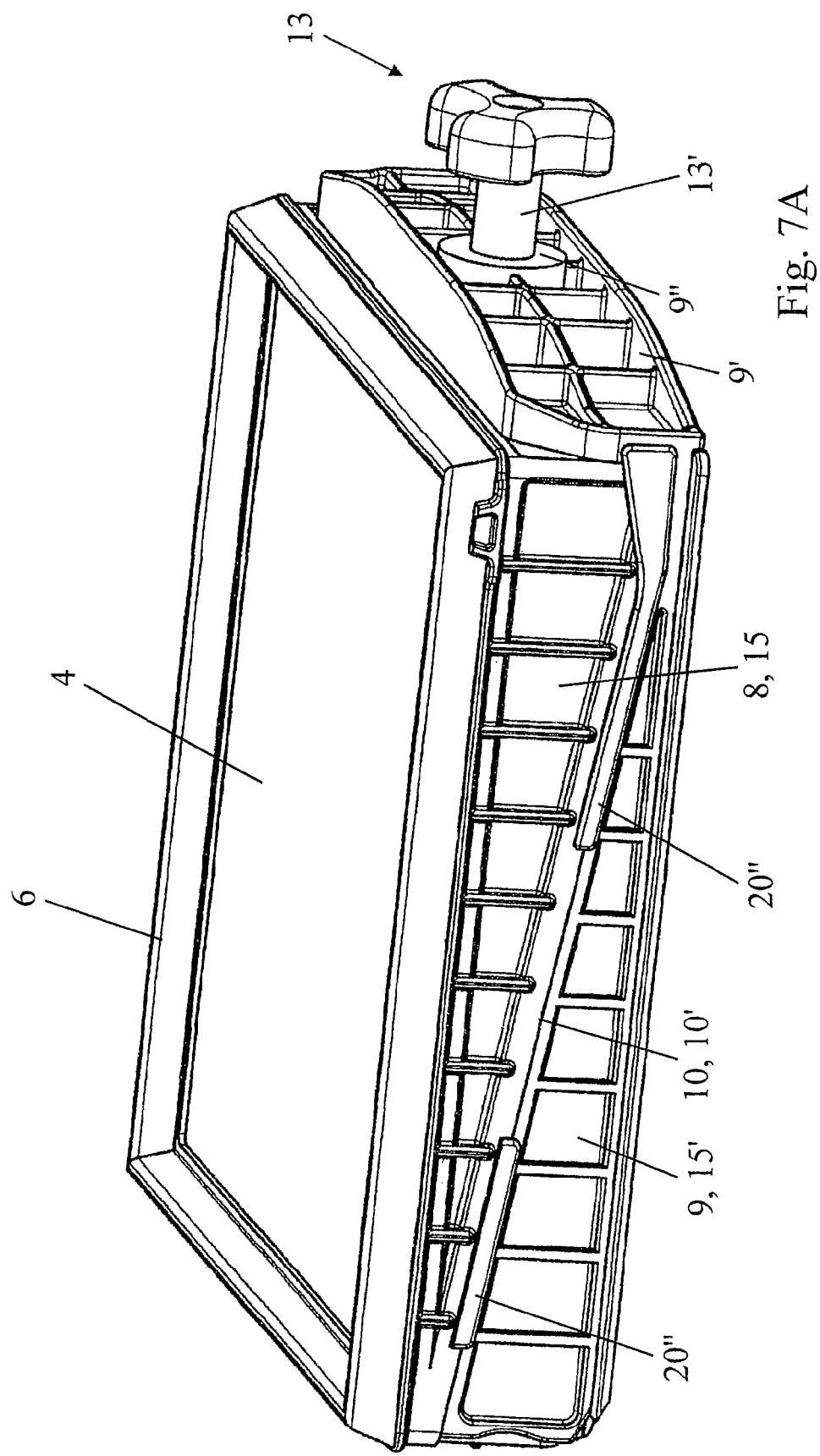

DRAWER AIR-FILTER DEVICE AND INLET ASSEMBLY HAVING SUCH A DEVICE

The present invention concerns the field of equipment for motor vehicles with internal combustion engines, particularly the air-inlet equipment of such vehicles, and relates to an air-filter device and an air-inlet assembly having such a device.

BACKGROUND OF THE INVENTION

Currently, air-filter devices for the above-mentioned vehicles generally comprise, basically, on the one hand, a casing, in one or more parts, defining a volume or so-called clean compartment receiving the filtered gases and a volume or so-called dirty compartment receiving the gases to be filtered, and, on the other hand, a filtering body separating the two above-mentioned compartments, installed in an intermediate mounting area or compartment and having a peripheral seal that comes to be applied against an edge or circumferential similar internal step of the casing, which delimits the said intermediate compartment in relation to the clean compartment.

The peripheral seal is usually insert-moulded round the external edge of the said filtering body or consists of a band area at the edges of the said filtering body.

One of the existing major concerns in the development of these air-filter devices is to optimise, in terms of accessibility, operational comfort and reliability, the operations involved in changing the filtering body at regular intervals.

To meet this demand, an air-filter device has been proposed, notably in document DE-A-2512724, in which the filtering body is made as an insert fitted with a frame, capable of being introduced and extracted by simple sliding, in the manner of a drawer, into an adapted intermediate compartment, provided with an adapted side access opening.

Tightness in the mounted condition is obtained by compressing the peripheral seal, during the introduction movement, against a circumferential application surface formed on the internal face of the casing. This compression movement is generated by sliding the bevelled or inclined sides of the frame upon surfaces of the opposite inclination present on the internal face of the casing.

However, in this construction, the seal risks being damaged and/or incorrectly positioned taking into account its displacement under pressure in relation to the casing.

In an attempt to overcome this drawback, it has been proposed, notably in document EP 0 391 019, to have a first supporting body receiving the filtering body and a second compression body designed to co-operate mechanically with the supporting body at the respective contact surfaces coming to bear in mutual sliding, the two above-mentioned bodies having structures in the form of frames and being mounted in the manner of sliding drawers in the intermediate compartment, the latter having a side access opening made in the casing to introduce and extract the filtering body/supporting body assembly, as well as any compression body, by sliding in respective opposite directions.

This compression body is also guided in sliding bearing along a second edge or similar circumferential internal step of the casing, delimiting the said intermediate compartment in relation to the dirty compartment, and may be moved selectively between a slackening off or release position or range of slackening off or release positions in which the seal of the filtering body is not compressed and a position of forced stress in which the filtering body is locked in position and its seal compressed, under the action of a control device that can be maneuvered from outside the casing and connected or built into a cover or cap designed to block off the side access opening.

Now, the contact surfaces in mutual sliding bearing, formed on the two opposite side parts of the frames of the supporting and compressing bodies forming the sides which extend in the opposite sliding directions possible for the said bodies, are shaped so as to have the opposite inclinations in relation to the said opposite sliding directions, so that a relative sliding between the said two bodies in one of the said directions results in an increase or release of compression by the supporting body of the seal of the filtering body.

Nevertheless, both of the above-mentioned constructions of air-filter have one major drawback, namely that sealing by compression is achieved by pushing in the direction of introduction of the filtering body, this push being transmitted, chiefly at the end of the introduction movement, when the force of the push and often the inertia of movement are at their maximum, to the casing and by the latter to its fixing points and to the parts that are connected to it.

The stress transmitted to the surroundings of the casing can have an intensity such as to generate clearances, even causing ruptures or breaks, at the interfaces where the efforts concerned are resumed, particularly in the event of pronounced friction (binding, jamming and fouling).

Moreover, the above-mentioned pushing movement is made by the operator without any control, except for the end-of-travel stop, in one go or a plurality of goes.

SUMMARY OF THE INVENTION

The prime object of the present invention is to overcome the above-mentioned drawbacks.

For this purpose, the present invention relates to an air-filter device of the type previously described characterised in that the respective inclinations of the contact surfaces in mutual sliding bearing of the support and compression bodies are defined in such a way that the forced stress position is achieved by displacement of the compression body in the direction of extraction and in that the control device stresses the supporting body and/or the casing in order to achieve the displacement of the compression body in a forced stress position, at least at the end of displacement.

BRIEF DESCRIPTION OF THE DRAWINGS

The invention will be better understood from the following description of preferred embodiments, given by way of non-limiting example, and explained with reference to the accompanying drawings, in which:

FIG. 1 is a functional diagram of an air-filter device according to a first variation of a first embodiment of the invention;

FIG. 2 is a functional diagram of an air-filter device according to a second variant of a first embodiment of the invention;

DETAILED DESCRIPTION OF THE INVENTION

Figure 3A:
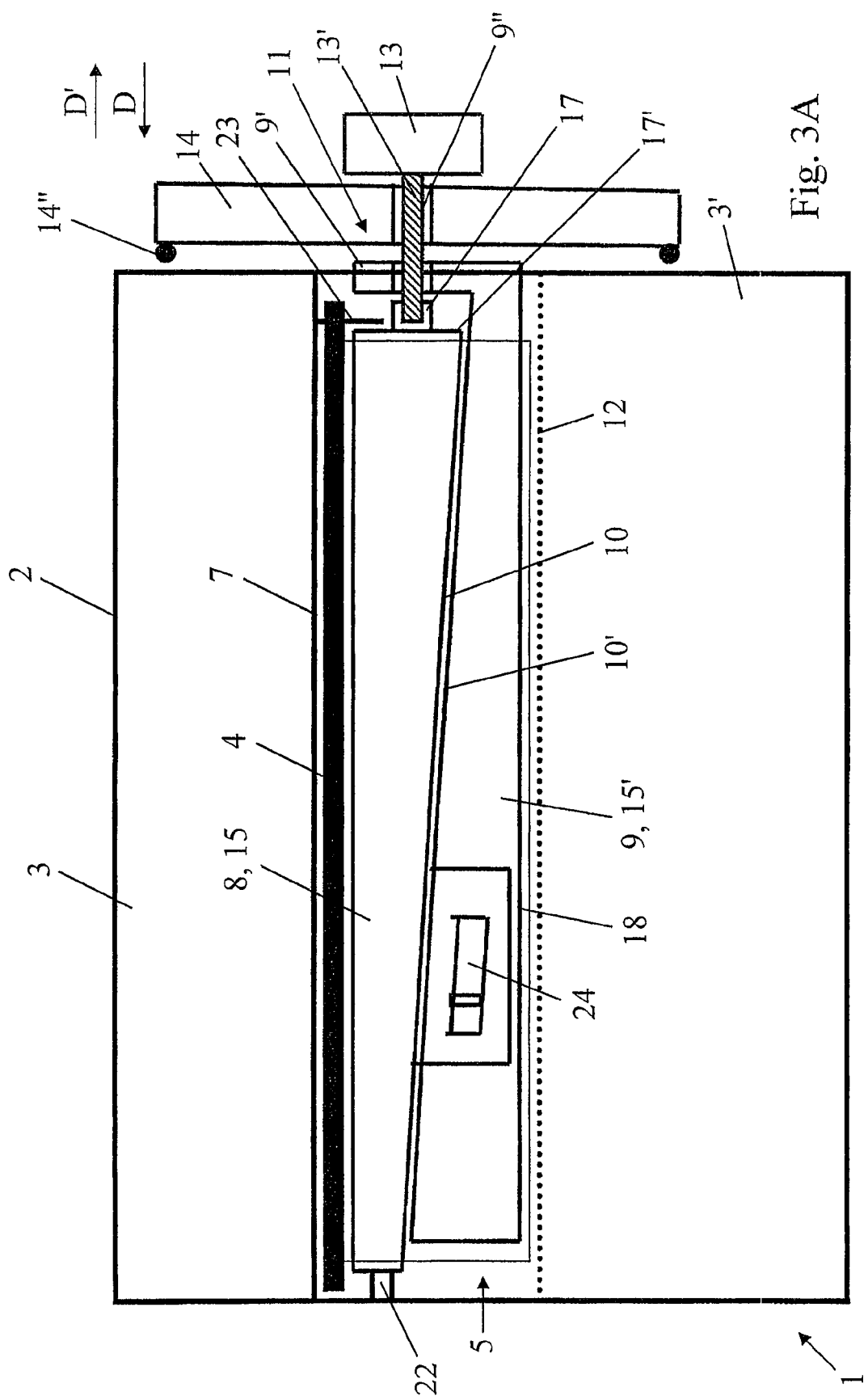
FIGS. 3A and 3B are functional diagrams of an air-filter device according to two variants of a second embodiment of the invention.

As shown in FIGS. 1 to 7 of the accompanying drawings, the air-filter device 1 basically comprises, on the one hand, a casing 2, in one or more parts 2', defining a volume or so-called clean compartment 3 receiving the filtered gases and a volume or so-called dirty compartment 3' receiving the gases to be filtered and, on the other hand, a filtering body 4 separating the two above-mentioned compartments, installed in an intermediate mounting area or compartment 5 and having a peripheral seal 6 that comes to be applied against an edge or circumferential similar internal step 7 of the casing 2, which delimits the said intermediate compartment 5 in relation to the clean compartment 3.

The said device 1 also comprises a supporting body 8 that locks or wedges up, possibly with lateral retaining means, the filtering body 4 in the mounted condition and a compression body 9 designed to co-operate mechanically with the supporting body 8 at the respective contact surfaces 10 and 10' coming to bear in mutual sliding, the two above-mentioned bodies 8 and 9 having structures in the form of frames and being mounted in the manner of drawers sliding in the intermediate compartment 5, the latter having a side access opening 11 made in the casing 2 to introduce and extract the filtering body 4/supporting body 8 assembly, as well as any compression body 9, by sliding in respective opposite directions D and D'.

The compression body 9 is also guided in sliding bearing along a second edge or similar circumferential internal step 12 of the casing 2, delimiting the said intermediate compartment 5 in relation to the dirty compartment 3', and may be moved selectively between a slackening off or release position or range of slackening off or release positions in which the seal 6 of the filtering body 4 is not compressed and a position of forced stress in which the filtering body 4 is locked in position and its seal 6 compressed, under the action of a control device that can be maneuvered from outside the casing 2 and connected or built into a cover or cap 14 designed to block off the side access opening 11.

The contact surfaces in mutual sliding bearing, formed on the two opposite side parts of the frames of the supporting and compression bodies forming the sides that extend in the opposite sliding directions that are possible for the said bodies, being shaped with opposite inclinations in relation to the said opposite sliding directions, so that a relative sliding between the said two bodies in one of the said directions leads to an increase or release of compression by the supporting body of the seal of the filtering body.

According to the invention, the respective inclinations of the contact surfaces in mutual sliding bearing 10 and 10' of the supporting and compression bodies 8 and 9 are defined so that the forced stress position is achieved by moving the compression body 9 in the extraction direction D' and so that the control device 13 stresses the supporting body 8 and/or the casing 2 to achieve the movement of the compression body 9 into the forced stress position, at least at the end of the movement.

Thus, the efforts applied by the operator (directly or indirectly) to lock the assembly (supporting body 8/filtering body 4) by compression are taken up internally by the air-filter device 1, substantially without transmitting stress to the outer surrounding elements connected to the casing 2.

Furthermore, the movement of the control device 13 and the resultant movement of the compression body 9 are of a limited extent, preferably with a demultiplication such as to reduce the effort necessary to manoeuvre the said device, even in the event of resistance to sliding by the compression body 9 (for example due to friction, fouling or other causes).

Advantageously, the extent of the compression movement of the filtering body 4 caused by the body 9 may be within $1/5^{th}$ and $1/10^{th}$ of the extent of the movement of translation of the said body 9 in direction D' (for example: 3 mm-21 mm).

According to a first embodiment of the invention, shown in FIGS. 1 and 2 of the accompanying drawings, the control device 13 consists of the cover itself 14, the latter being made in the form of a pivoting cover, and connected to the compression body 9 by a pivot connection 16 so that lowering the said cover 14 towards its position of blocking the side access opening 11 causes a sliding of the compression body 9 towards the stress position, the said pivoting cover 14 being lockable in the blocking position.

The passage freed up by the cover 14 in the open position will be sufficient to enable the extraction of the supporting body 8/filtering body 4 assembly, without the need to extract the compression body 9 as well.

The said cover 14 is also fitted with a seal or a plurality of portions of a seal 14" making it possible to seal off the access opening 11 when the said cover 14 is in the closed position. In this position, it is also locked by locking means 14''' or removable means of connection, such as screws, nuts, clamps, lugs or resilient clips or suchlike.

According to one variant not shown, the pivoting cover 14 can be fitted pivoting on the casing 2, at the side access opening 11, so as to form a lever, the said cover 14 preferably having a stop on its inner face to lock the supporting body 8 in the mounted position.

According to another variant, and as shown in FIG. 1 of the accompanying drawings, the cover 14 may come to bear, at least at the end of the lowering movement in the blocking position, on the supporting body 8, preferably at a stop area 17 of a part 17' of the frame of the supporting body 8 near the side access opening 11, thus creating a lever stressing the supporting body 8 and the compression body 9 in an opposing manner.

Lastly, as shown in FIG. 2 of the accompanying drawings, the cover 14 may also be pivoted only on the compression body 9, which is then moved to the forced stress position by bringing the said cover 14 into the blocking position against the wall of the casing 2 (effort can be taken up around the access opening 11).

According to a second embodiment of the invention, shown in FIGS. 3A, 3B, 6 and 7 of the accompanying drawings, the control device 13 may consist of a traction device connected to the compression body 9, the said device 13 bearing on the cover 14, on the supporting body 8 and/or on the casing 2, at least at the end of the movement of the compression body 9 in the forced stress position.

Advantageously, when the device 13 bears on the cover 14, and for example passes through the latter, it will also contribute to holding in place and achieving the seal at the opening 11 (compression of the cover seal 14").

Figure 3B:
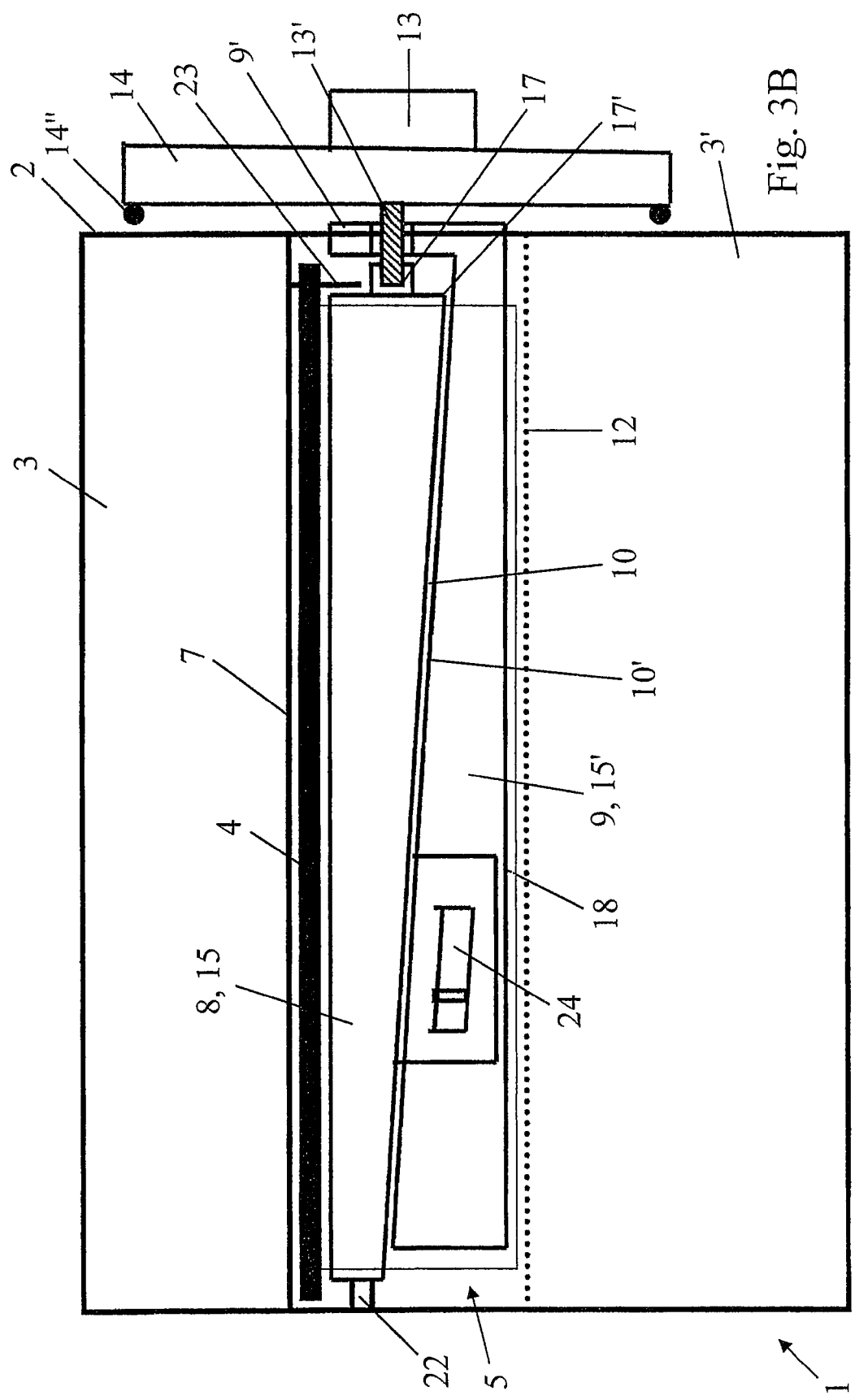

As a variant, within the scope of this second embodiment, the control device 13 may also be built into the cover 14, forming a distinctive part of the said cover (FIG. 3B).

Figure 6:
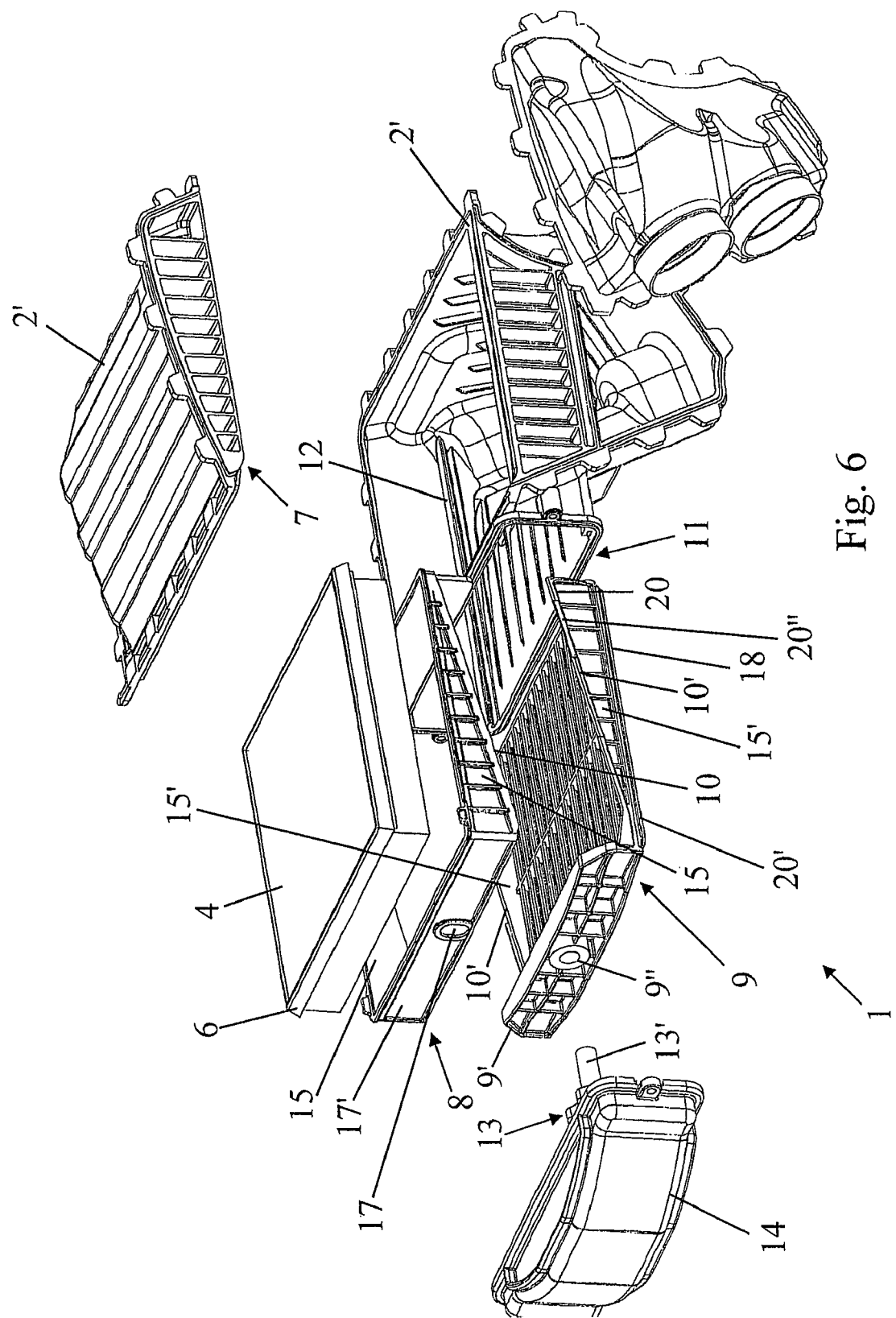
FIG. 6 is an exploded perspective view of an air-filter device according to a practical embodiment of the invention, in relation to the second embodiment, and, FIGS. 7A and 7B are perspective views of the assembly [supporting body+compression body+filtering body+control device] forming part of the device shown in FIG. 6, in the released position (FIG. 7A) and in the forced stress position (FIG. 7B) respectively of the compression body.
Figure 7B:
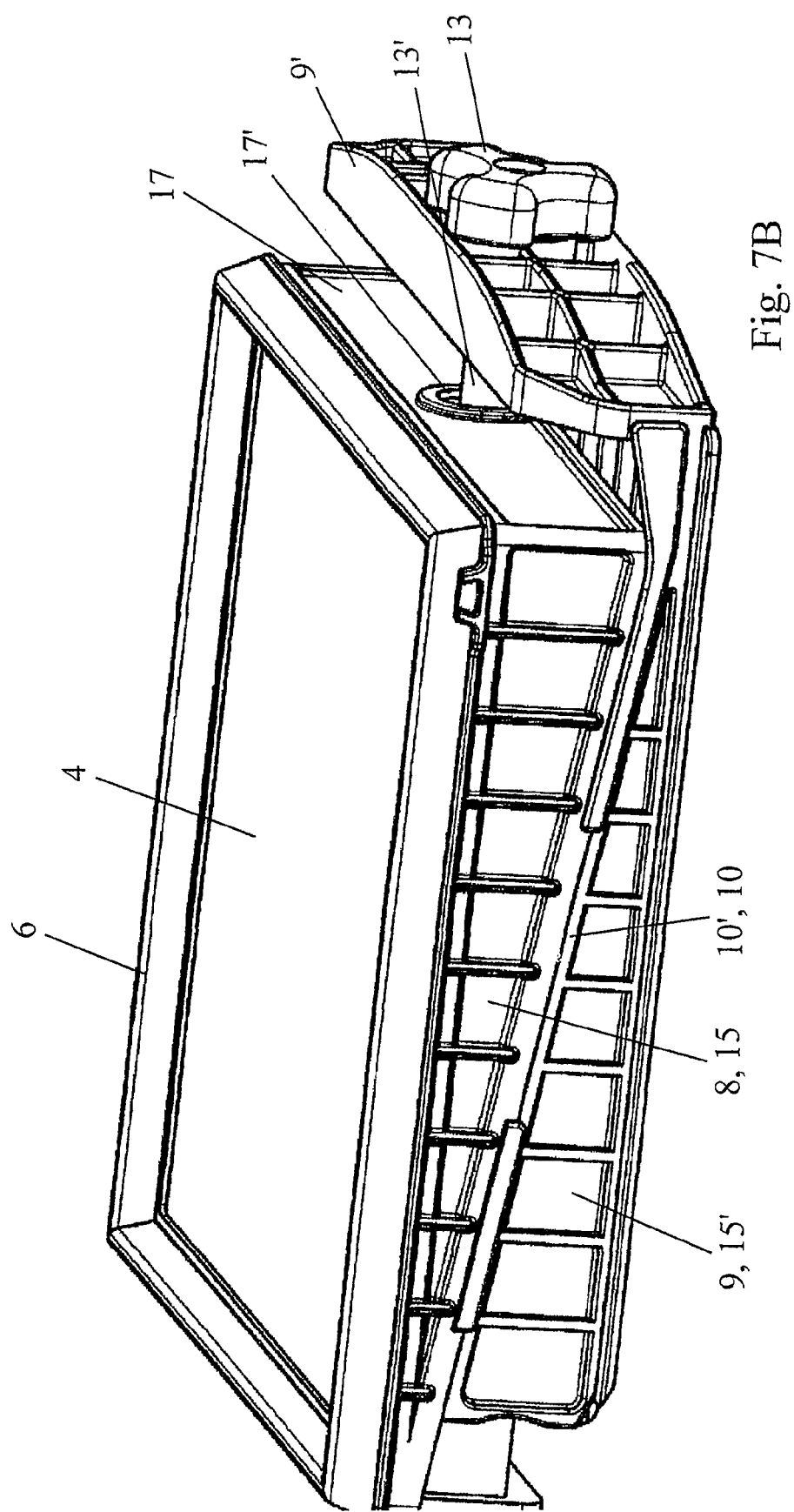

The control device 13 may also be located beneath the cover or cap 14, being covered by the latter (FIGS. 6 and 7).

By way of preferred examples, the control device 13 may be maneuvered progressively, for example by rotation, or by tilting, passing through a point of resistance.

As shown in FIGS. 3A and 3B, and FIGS. 1, 3, 6 and 7, the device 13 may for example consist of a rotating knob with a threaded shank 13' engaging in a threaded orifice 9'' of a part in the form of a wing 9' of the frame of the compression body 9, in the manner of a nut/screw assembly, it being possible for the free end of the said threaded shank 13' to bear on the supporting body 8 (end-stop area 17). Thus, a rotation of the rotating knob 13 will cause a sliding in translation of the compression body 9.

Preferably, and as shown in FIGS. 1, 3, 6 and 7, the control device 13 also locks the supporting body 8 in the mounted position, for example by coming to bear at an end-stop area 17 of a part 17' of the frame of the supporting body 8 near the side access opening 11.

According to a practical embodiment of the invention, the opposite side parts 15, 15' of the frames forming the supporting body 8 and compression body 9, which extend in the opposite directions of sliding D, D' of the said bodies, have the form of portions of wall with a wedge profile arranged head to foot. Furthermore, the mutual contact surfaces 10, 10' of the supporting 8 and compression bodies 9, as well as the contact surfaces 18 of the compression body 9 guided in sliding bearing along the second edge or step 12 in both sliding directions D, D', are then provided by the side wings 19, 20, 20' of the above-mentioned sides or opposite side parts 15, 15' of the said frames. Moreover, the edges or steps 7 and 12 are advantageously formed in a recess towards the outside of the wall of the casing 2 corresponding with the intermediate compartment 5, so as to be located outside the common passage section of the casing 2 at this level and also to enable the bodies 8 and 9 to be positioned substantially outside the flow crossing the operational part of the filtering body 4.

When the thickness of the filtering body 4, generally in the form of a plate or parallelepiped block, is less than the cumulative widths of the wall portions of parts 15 and 15', the volume of the dirty compartment 3' extends into the internal spaces of the frames of the said bodies 8 and 9.

Figure 4A:
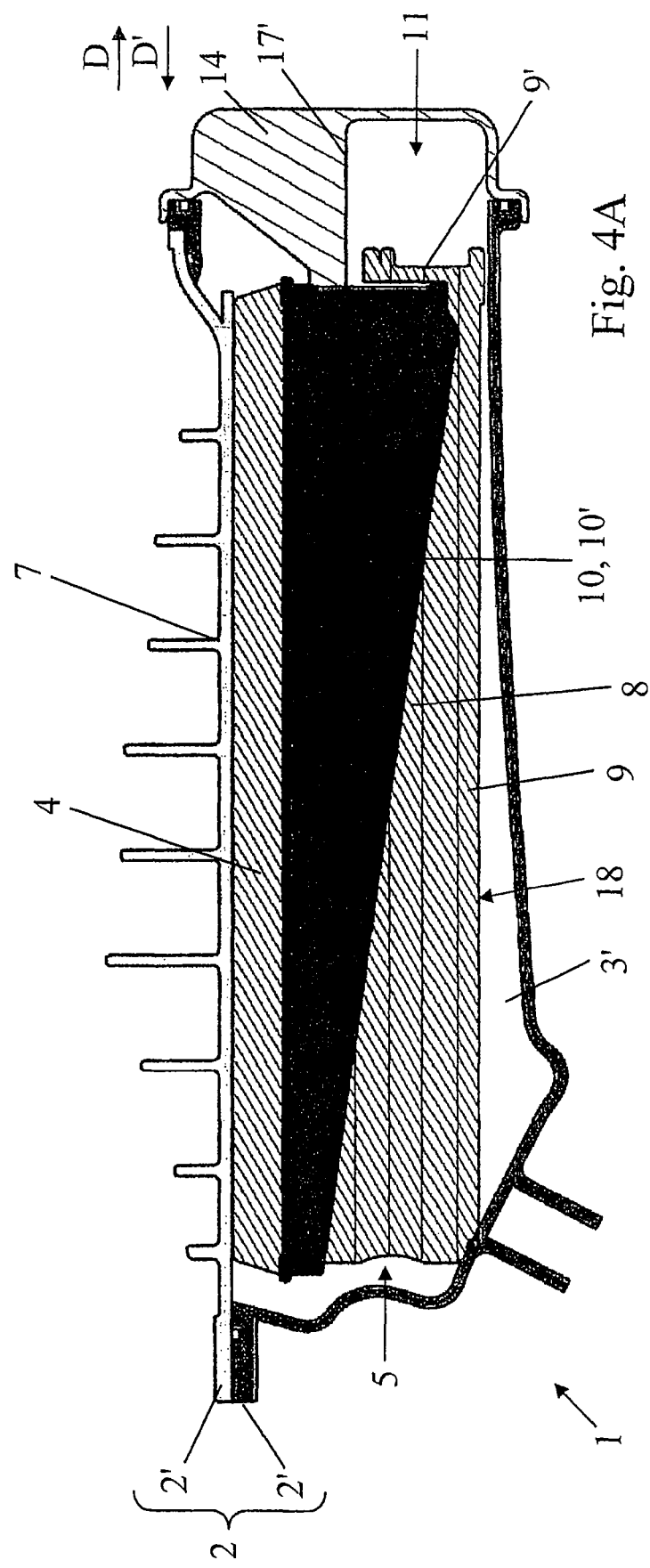
FIGS. 4A and 4B are longitudinal cross sections of an air-filter device according to a possible practical embodiment of the invention, showing the compression body in a released position (FIG. 4A) and a forced stress position (FIG. 4B)
Figure 4B:
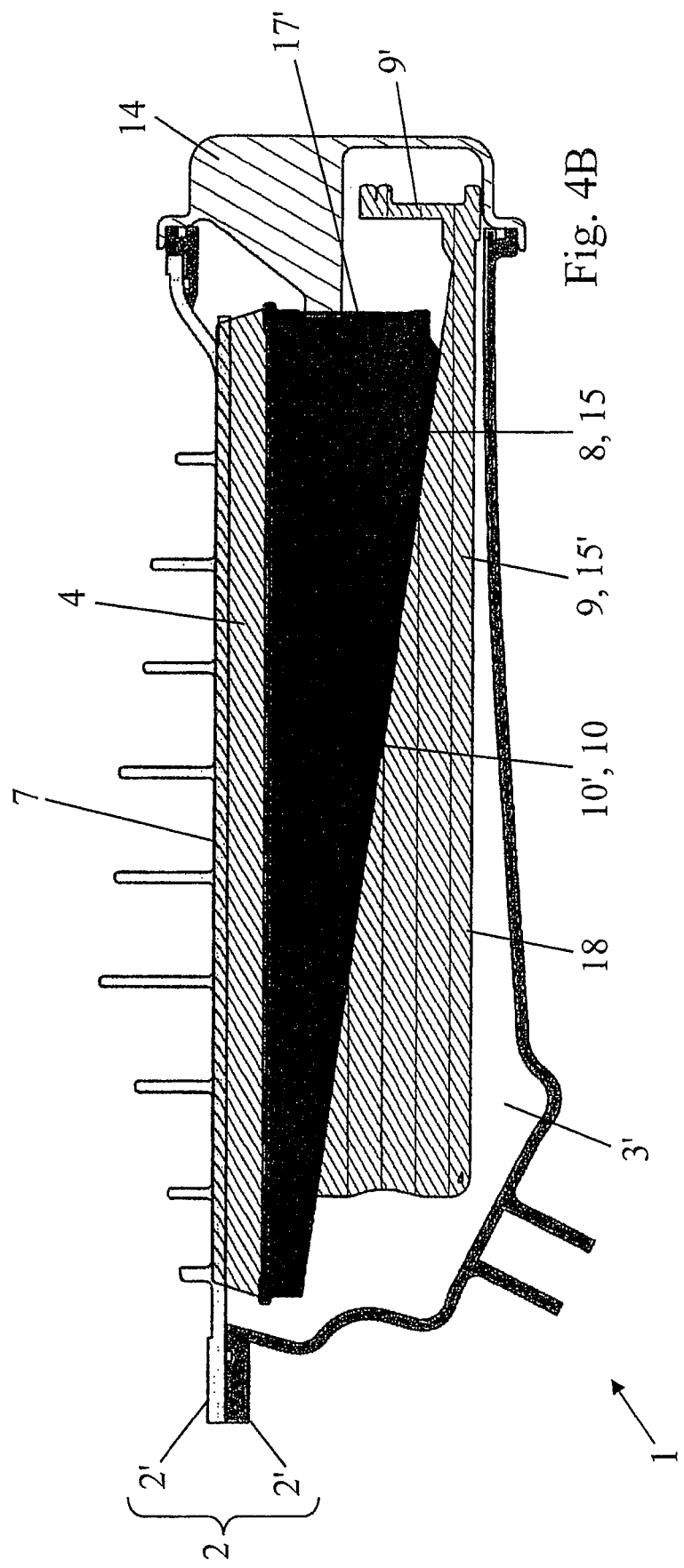
Figure 5A:
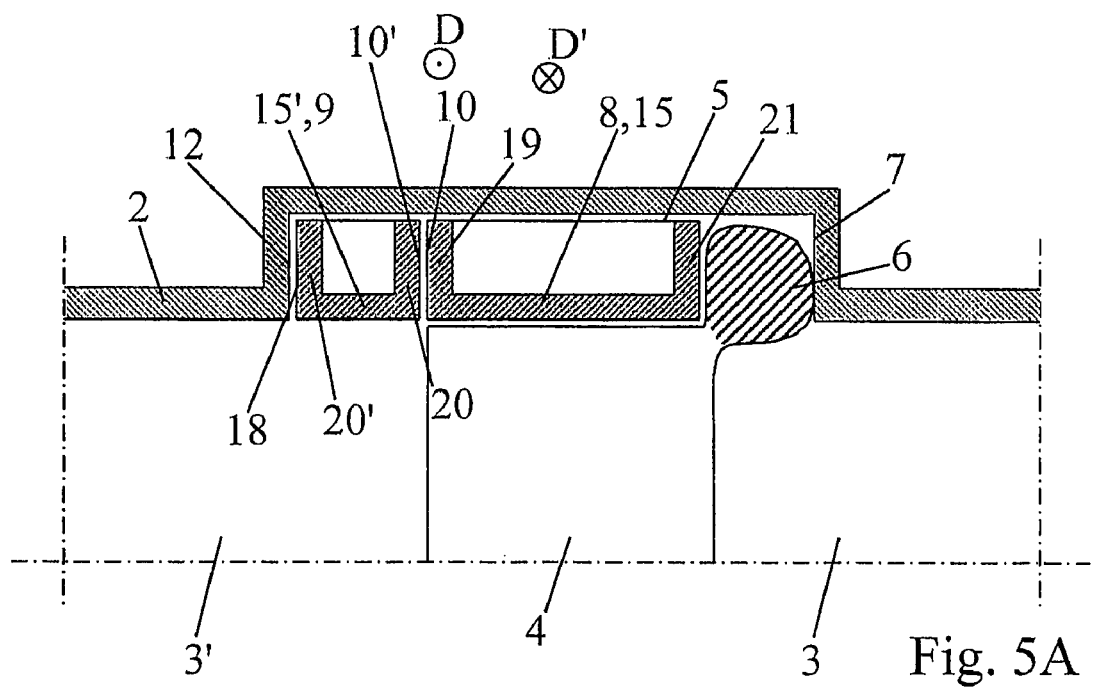
FIGS. 5A and 5B are partial cross-sections in a plane perpendicular to the planes of FIGS. 4A and 4B of two variants of practical embodiments of the invention, in terms of the make up and side guidance of the supporting and compression bodies that form part of the air-filter device.
Figure 5B:
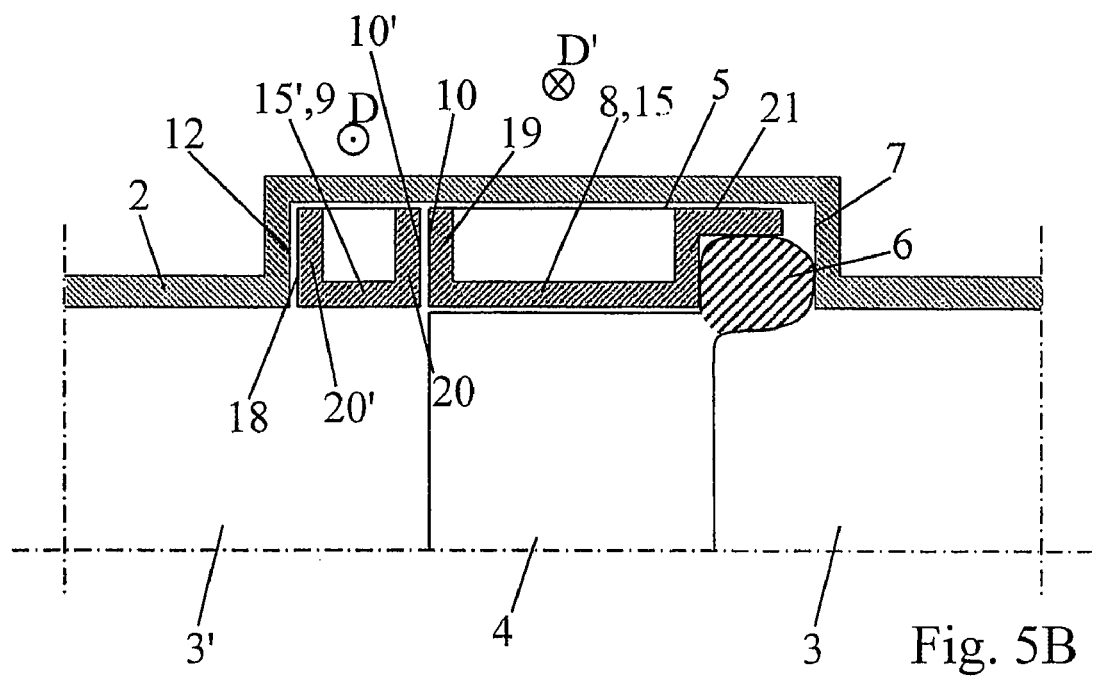

As shown in FIGS. 4 and 5 of the accompanying drawings, the filtering body 4 is at least partially received and held encompassed in the frame of the supporting body 8, the latter having a circumferential edge 21 receiving the peripheral seal 6 and ensuring its compression and side holding against the corresponding edge or step 7 of the casing 2, possibly simultaneously constituting a maximum compression end-stop (FIG. 5B).

Moreover, as stated above, the filtering body 4 may, depending on its nature and type, have a seal 6 inserted by gluing or moulding a suitable material, or have a seal 6 made integral with the filtering body 4, for example in the form of a band of peripheral material, possibly adapted for this purpose by shaping, forming or special treatment of its constituent material.

As shown in FIG. 6, each edge 12 may, in a variant, be in the form of a runner inside which slides a wing 20' of the compression body 9 having a contact surface or surfaces 18.

Similarly, the side parts 15' of the compression body may have, at their wings 20, a side edge or side edge portions 20''assuring the side guidance of the supporting body 8 on the compression body 9 at their contact surfaces 10 and 10' bearing in mutual sliding bearing. In this case, the provision of a receiving recess in the wall of the casing 2 is no longer necessary.

In order to ensure proper fitting in the mounted position and a single extraction of the supporting body 8/filtering body 4 assembly, advantageously the intermediate compartment 5 has an end-stop 22 to lock or stop the supporting body 8 in the direction of insertion D and the filtering body 4 has an end-stop 23 locking the supporting body 8 in the direction of extraction D', the supporting body 8 and compression body 9 possibly being connected by an end-of-travel drive link 24, notably in the direction of extraction D'.

In order to further reduce the operations involved in replacing the filtering body 4 and to make the latter easier to perform, the supporting body 8 and the filtering body 4 may form a single body, obtained by manufacturing them in one piece, possibly in a plurality of successive stages, or by assembly, for example by gluing or welding.

The present invention also relates to an air inlet assembly for a vehicle with an internal combustion engine, characterised in that it comprises at least one air-filter device 1 such as that described above.

Clearly, the invention is not limited to the embodiments described and shown in the accompanying drawings. Modifications are still possible, notably from the point of view of the make-up of the various elements or by replacement with technical equivalents, without departing from the scope of protection of the invention.

The invention claimed is:

1. An air-filter device comprising:
   a casing defining a clean compartment receiving filtered gases and a dirty compartment receiving gases to be filtered, said casing including a side access cover for covering a side access opening communicating with the clean and dirty compartments;
   a filtering body separating the clean and dirty compartments, installed in an intermediate mounting area, and having a peripheral seal that is applied against a circumferential internal step of the casing, said internal step delimiting the intermediate mounting area in relation to the clean compartment;
   a supporting body for receiving the filtering body and having a side contact surface;
   a compression body having a side contact surface and mechanically cooperating with the side contact surface of the supporting body;
   a side access opening made in the casing for inserting and extracting the filtering body, supporting body, and compression body;
   said side contact surface of the supporting body having a first inclination, and said side contact surface of the compression body having a complementary second inclination; and
   wherein the filtering body, the supporting body and the compression body are placed within the casing by movement in a direction of insertion into the casing, and the seal of the filtering body is compressed against the internal step by displacement of the compression body in a direction of extraction that is opposite to the direction of insertion while keeping the filtering body and supporting body stationary, thereby placing the device in a forced stressed position; and
   a control device cooperating with the compression body and mounted to the casing for controlling displacement of the compression body to slide selectively between the direction of insertion and the direction of extraction to thereby selectively place the device between a release position in which the seal of the filtering body is not compressed, and the forced stress position.

2. An air-filter device as claimed in claim 1, wherein:

said control device is integrated with said side access cover, the side access cover further including a pivot connection wherein lowering said side access cover towards a position to block the side access opening causes engagement of the side access cover with the compression body, thereby moving the compression body in the direction of extraction to thereby compress the seal.

3. An air-filter device as claimed in claim 2, wherein:
the side access cover forms a lever, and the side access cover further includes a stop located on an inner-face of the side access cover to lock the supporting body in a mounted position.

4. An air-filter device as claimed in claim 2, wherein:
the side access cover contacts a stop area on the supporting body near the side access opening thereby creating a lever that causes the supporting body to remain stationary and the compression body to move in the direction of extraction for compression of the peripheral seal.

5. An air-filter device as claimed in claim 1, wherein:
said control device comprises a traction device contacting the compression body and connected to the supporting body for leveraging selective movement of the compression body in the direction of extraction.

6. An air-filter device as claimed in claim 5, wherein:
the control device is maneuvered progressively by rotation to place the device in the forced stress position.

7. An air-filter device as claimed in claim 5, wherein:
the control device is maneuvered by tilting, thereby passing through a point of resistance to selectively place the device in the forced stress position.

8. An air-filter device as claimed in claim 5, wherein:
the control device locks the supporting body in a mounted position by contacting a stop area on a frame of the supporting body near the side access opening.

9. An air-filter device as claimed in claim 1, wherein:
said side contact surface of the supporting body extends in an opposite direction as compared to the side contact surface of the compression body, and a complementary configuration of the side contact surfaces further include side wings to facilitate sliding contact of the side contact surfaces.

10. An air-filter device as claimed in claim 1, wherein:
said supporting body comprises a frame with a circumferential edge for receiving the peripheral seal of the filtering body.

11. An air-filter device as claimed in claim 1, wherein:
said intermediate mounting area further includes an end stop to lock the supporting body in a mounted position in the direction of insertion, and the filtering body has an end stop locking the supporting body in the direction of extraction, the supporting and compression bodies being further connected by an end of travel drive link arranged in the direction of extraction.

12. A method of mounting an air filter device, said method comprising:
providing a casing defining a clean compartment receiving filtered gases and a dirty compartment receiving gases to be filtered, said casing including a side access cover for covering a side access opening communicating with the clean and dirty compartments;
installing a filtering body in an intermediate area separating the clean and dirty compartments, the filtering body having a peripheral seal that is applied against a circumferential internal step of the casing, said internal step delimiting the intermediate mounting area in relation to the clean compartment;
providing a supporting body for receiving the filtering body and said supporting body having a side contact surface;
providing a compression body having a side contact surface and mechanically cooperating with the side contact surface of the supporting body;
providing a side access opening in the casing for inserting and extracting the filtering body, supporting body, and compression body, said side contact surface of the supporting body having a first inclination, and said side contact surface of the compression body having a complementary second inclination; and
placing the filtering body, the supporting body and the compression body within the casing by movement in a direction of insertion into the casing;
compressing the seal of the filtering body against the internal step by displacement of the compression body in a direction of extraction that is opposite to the direction of insertion and keeping the filtering body and supporting body stationary, thereby placing the device in a forced stressed position; and
controlling displacement of the compression body to slide selectively between the direction of insertion and the direction of extraction by providing a control device cooperating with the compression body and mounted to the casing; and
selectively placing the device between a release position in which the seal of the filtering body is not compressed, and the forced stress position.

* * * * *